United States Patent [19]

Nakayama

[11] Patent Number: 4,647,167
[45] Date of Patent: Mar. 3, 1987

[54] DISK FILM PROJECTOR

[75] Inventor: Yoshiaki Nakayama, Tokyo, Japan

[73] Assignee: Fuji Photo Film Co., Ltd., Kanagawa, Japan

[21] Appl. No.: 645,075

[22] Filed: Aug. 28, 1984

[30] Foreign Application Priority Data

Aug. 29, 1983 [JP] Japan ............................ 58-156335

[51] Int. Cl.$^4$ .......................................... G03B 27/62
[52] U.S. Cl. .................................................. 353/110
[58] Field of Search ............... 353/110, 108, 109, 19, 353/120, 122, 121; 40/362, 366, 367

[56] References Cited

U.S. PATENT DOCUMENTS

| 2,712,268 | 7/1955 | Dietmann | 353/110 X |
| 3,322,035 | 5/1967 | Admon | 353/110 X |
| 4,392,743 | 7/1983 | Anderson | 353/110 X |

FOREIGN PATENT DOCUMENTS 509290  1/1955  Italy .................................. 353/110

Primary Examiner—Harry N. Haroian
Attorney, Agent, or Firm—Birch, Stewart, Kolasch & Birch

[57] ABSTRACT

In a disk film projector, a desired frame of an image recorded on a rotary disk of film is selectively placed at a projecting position for reproducing a selected frame in the form of a visible image. The disk film is designed to be rotatably driven to the projecting position by either manual or electrical driving devices. The manual driving device is mechanically connected with the disk film driving shaft, while the electrical driving device is detached from the shaft unless the electrical driving device is in operation. In this manner, the electrical driving device does not act as a load when the manual driving device is used, so that manual operation of the projector will be facilitated.

4 Claims, 7 Drawing Figures

DISK FILM PROJECTOR

BACKGROUND OF THE INVENTION

1. Field of the Invention

This invention relates to a disk film projector, and more particularly, to a disk film projector which reproduces an image recorded on a rotary disk of film into a visual image.

2. Description of the Prior Art

There is known in the art a photosensitive film in the form of a rotary disk, or a so-called disk film, on which still images are to be recorded.

Recorded images on a disk film may be reproduced in the form of a hard copy or print. There is also a remarkable demand for obtaining a soft copy from a disk film for use. Because of the smaller size of a frame of the disk film, it is necessary to reproduce a frame of the image in the form of a soft copy which is enlarged to a size suitable for use. Negative images recorded on the negative type of disk film must be reversed into positive images.

These demands may advantageously be satisfied with a technique by which frames of a disk film are shot with a television camera to produce video signals representative thereof, which are in turn used for image reproduction on an image display device such as a CRT, and/or recordation on a recording medium such as a magnetic tape, magnetic disk, as the case may be.

For shooting desired one of the frames of a disk film by a television camera, the disk is loaded in a projector to be rotated for setting the desired using frame to the projecting position thereof. For practical purposes, the disk may advantageously be rotated both manually and by electrical driving means for the disk film.

Frames are recorded along the circumference of the disk film. In order to random access to a desired frame, manual operation may give rise considerable reduction in access time than electrical driving means for incrementally advancing a frame at a time. In a customary disk film, the number of a frame is indicated in a margin of the film between the adjoining frames. Therefore, a desired frame may be retrieved by rotating the disk slowly in manual operation to bring a frame number indication associated therewith at the projecting position for visually checking the indication.

On the other hand, electrical driving may preferably be applicable to consecutive shooting of a large number of frames, synchronized stepping of the disk frames with voice reproduction, or controlling incremental advancement of frames from a remote position. It is therefore required that the projector be designed to cause a disk film to rotate in response to both manual and electrical movements.

For satisfying the demand, both electric motor and manual rotating elements are operatively linked with a driving shaft causing the rotation of the disk film. In general, in order to design an apparatus reduced in size, a small-sized electric motor capable of producing a higher r.p.m. is used to produce a high driving torque in conjunction with an associated driving mechanism having a higher gear ratio. When a motor drive mechanism including such a small-sized electric motor and a driving mechanism of higher gear ratio is driven as an external load, however, it works as a heavy load of torque. With a system in which the electric motor is perpetually interconnected with the manual driving mechanism by the driving shaft, therefore, the motor will act as a heavy load when the manual driving mechanism is operated manually. It is therefore difficult to accomplish a rapid random access to a desired frame of the disk.

Moreover, in a system in which the electric motor is linked directly to the driving shaft, the accuracy in adequately positioning a desired frame at the projecting station is accomplished only by providing an electric motor presenting high positioning accuracy, or a special positioning device in the driving system.

SUMMARY OF THE INVENTION

It is therefore an object of the present invention to provide a disk film projector in which a desired one of the frames of a disk film can be selected by means of a simplified structure responsive to both manual and electrical driving.

In accordance with the present invention, a disk film projector, in which the desired one of a plurality of frames of an image recorded on a rotary disk of film having a central engaging part is selectively placed at a projecting position for reproducing a selected one of the frames in the form of a visible image, comprises a rotary driving shaft engageable with said engaging part, an electric motor, manual operating means connected to said rotary driving shaft for manually rotating said shaft, means for permitting said rotary driving shaft to be intermittently stopped at positions associated with said frames to selectively stop the frames at the projecting position, and connecting means interposed between said electric motor and rotary driving shaft for mechanically connecting said electric motor to said driving shaft when the motor is driven.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

An embodiment of a disk film projector in accordance with the present invention is hereinafter described with reference to the accompanying drawings.

Figure 1:
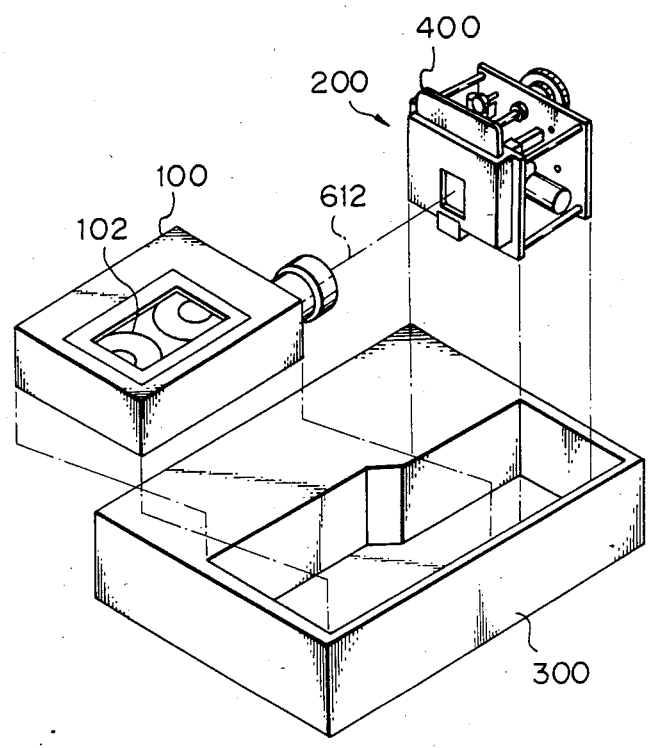
FIG. 1 is a perspective view showing an embodiment of a disk film image reproducing system in accordance with the present invention.

In FIG. 1, there is shown an example of a disk film image reproducing system which includes a television camera 100 having an image pickup tube or a solid-state imaging device, and a disk film projector 200, which are to be installed in a common housing 300, as depicted by the chain-and-dot lines. In the present embodiment, the camera 100 may advantageously be of the type which is designed to be detachably loaded with a video tape cassette 102 for magnetic recording of video signals, and is so-called a video taperecorder built-in type television camera. The housing 300 includes image processing circuitry such as a reversing circuit for converting, for example, signals indicative of a negative image into those of a positive image.

Figure 2:
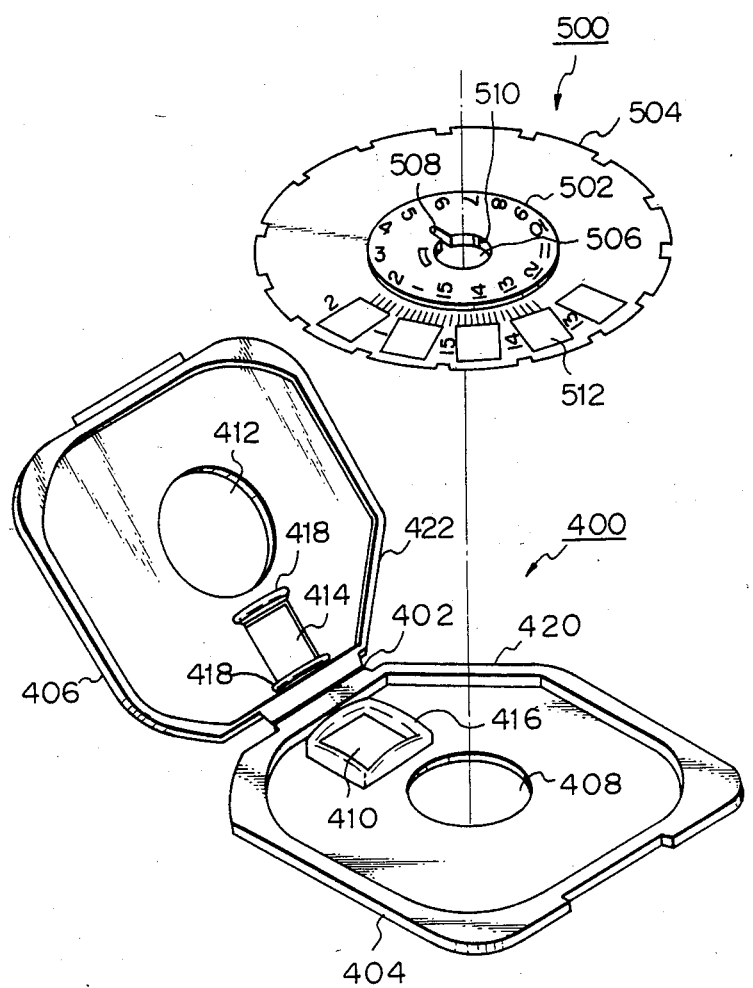
FIG. 2 is a perspective view showing a cartridge for reproduction of a disk film capable of being loaded into the disk film projector shown in FIG. 1.

A cartridge 400 for reproducing disk film images is removably mounted to the disk film projector 200. As shown in FIG. 2, the cartridge 400 is made up of a pair of generally rectangular, saucer-like housing sections, or halves, 404 and 406 with rounded corners, which sections are connected to each other by a hinge 402 for establishing a protective enclosure for a disk 500.

The disk 500 is made up of a circular core 502, which may be of molded synthetic material, and a disk of photosensitive film 504 supported by the core 502. A generally circular opening 506 is formed at the center of the core 502, and contiguous to a key slot 508 with a plurality of cut-outs 510 formed along on the periphery of the opening 506. In the present embodiment, fifteen rectangular pictures or frames 512 can be recorded on the photosensitive film 504.

The housing shell, or section, 404 has a central circular opening 408 cut in register with the core 502, and a peripheral rectangular opening 410 cut in a portion of the periphery thereof in correspondence in shape to the frame 512. Similarly, the housing shell, or section, 406 has a central circular opening 412 and a peripheral rectangular opening 414.

The housing sections 404 and 406 are thickened along the peripheral rim edges for defining inner recessed portions in which the disk 500 is accommodated. One of the corners of the rectangle of the housing section 404 is formed into a straight edge 420. The corresponding one of the rectangular corners of the other housing section 406 is similarly formed into a straight edge 422. The straight edges 420 and 422, when mating each other, permit the cartridge 400 to be adequately oriented to be loaded into the projector 200. The opening 410 is delimited and surrounded by a projecting rim 416, while the opening 414 is partially delimited by two opposite projecting flanges 418 cooperating with part of the rim 416 for defining a reference level of plane, in which a frame 512 of the film 504 is involved when loaded at a projecting position of the projector 200.

Referring now to FIGS. 3 to 6, the disk film projector 200 has two flat plates 202, 204 connected to each other by supporting members 206. A cartridge holder 208 for holding the cartridge 400 is supported by supporting members 210. The cartridge 400 may be enclosed within a recess 212 defined by the cartridge holder 208.

A spindle 214 is supported within central circular holes of the flat plates 202 and 204 for rotation about its axis. The spindle position is in register with the position of the opening 506 of the circular core 502 when the cartridge 400 enclosing the disk 500 is inserted completely into its loading position within the recess 212.

To one end of the spindle 214 is fastened an end piece 216 having its tip 218 projecting with a gradient and profiled for engaging with the opening 506 of the circular core 502. The end piece 216 is generally cylindrical and provided with a plurality of peripheral lugs 220, which are engageable with peripheral cut-outs 510 of the opening 506. The end piece 216 is also provided with an annular flange 222 larger in diameter than the opening 506 so that it would not be thrusted past the opening 506.

A gear 224 is fixed to the other tubular end of the spindle 214. A supporting member 226 in the form of a shaft is slidably mounted in the hollow interior of the spindle, and secured to an L-shaped supporting member 229 which is secured in turn to the flat plate 204. Hence, the spindle 214 is telescopically supported within the supporting member 226.

Figure 5:
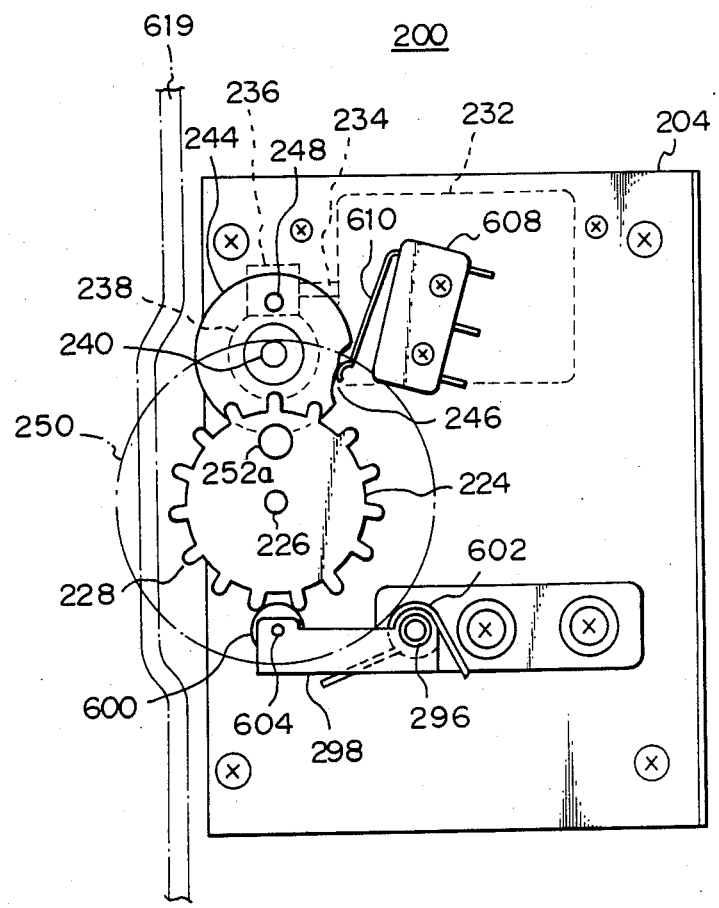
FIG. 5 is a right-hand side view showing the projector of FIG. 3.

As shown in FIG. 5, the gear 224 has fifteen teeth 228, in this instance. An electrical motor 232 is supported on the flat plate 204 by an L-shaped supporting member 230. The electric motor 232 may preferably be a d.c. motor provided with a driving, or output, shaft 234 mounted with a worm 236. The latter is engaged with a worm wheel 238 secured to one end of a shaft 240.

The shaft 240 is rotatably supported by a supporting member 242 secured to the flat plate 204. The shaft 240 has a cam 244 secured to the other end thereof. The cam 244 has a peripheral cut-out 246, as clearly shown in FIG. 5 again. The flat plate 204 carries a limit switch 608, as shown in FIG. 5. The limit switch 608 has a movable arm 610 the foremost part of which slides on the periphery of the cam 244 so as to descend into the cut-out 246 as the cam 244 rotates. The limit switch 608 is responsive to such descent of the movable arm 610.

Figure 7:
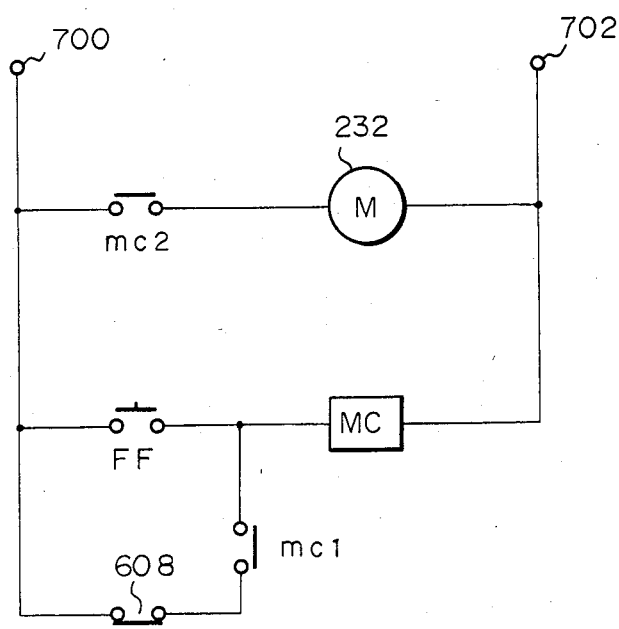
FIG. 7 is a circuit diagram showing an embodiment of the control circuit for an electric motor involved in the device of FIG. 3 for rotating the disk film.

The limit switch 608 is used, for example, for controlling the stopping of the electric motor 232. An example of a control circuit for the motor 232 is shown in FIG. 7. In this figure, relay windings are indicated by uppercase letters, and contacts driven thereby are indicated by corresponding lowercase letters. In the circuit, the motor 232 and a contact mc2 of a relay MC are connected in series between source terminals 700 and 702, to which d.c. power is supplied. The relay MC has its winding connected to source terminals 701 and 702 via an operating switch FF, which is adapted for energizing the motor 232, in response to a single touch thereon, to rotate the disk film 504 by an angle associated with two adjacent frames. The relay MC also has a self-holding circuit which is formed by a serial connection of the break, or normally closed, contact of the limit switch 608 and a contact mc1 thereof.

When the switch FF is depressed, relay MC is energized to be held by itself by its contact mc1. This causes in turn the motor 232, and hence cam 244, to rotate. As the cam 244 rotates, and the arm 610 of the limit switch 608 in turn descends into the cut-out 246, the break contact of the limit switch 608 is opened for releasing the self-held relay MC. The motor 232, started from the state shown in FIG. 5, is thus stopped after one complete revolution. Accordingly, the present circuit necessarily causes the motor 232 to be stopped in the state in which the boss 248, described later, is not engaged with the gear 224.

Figure 3:
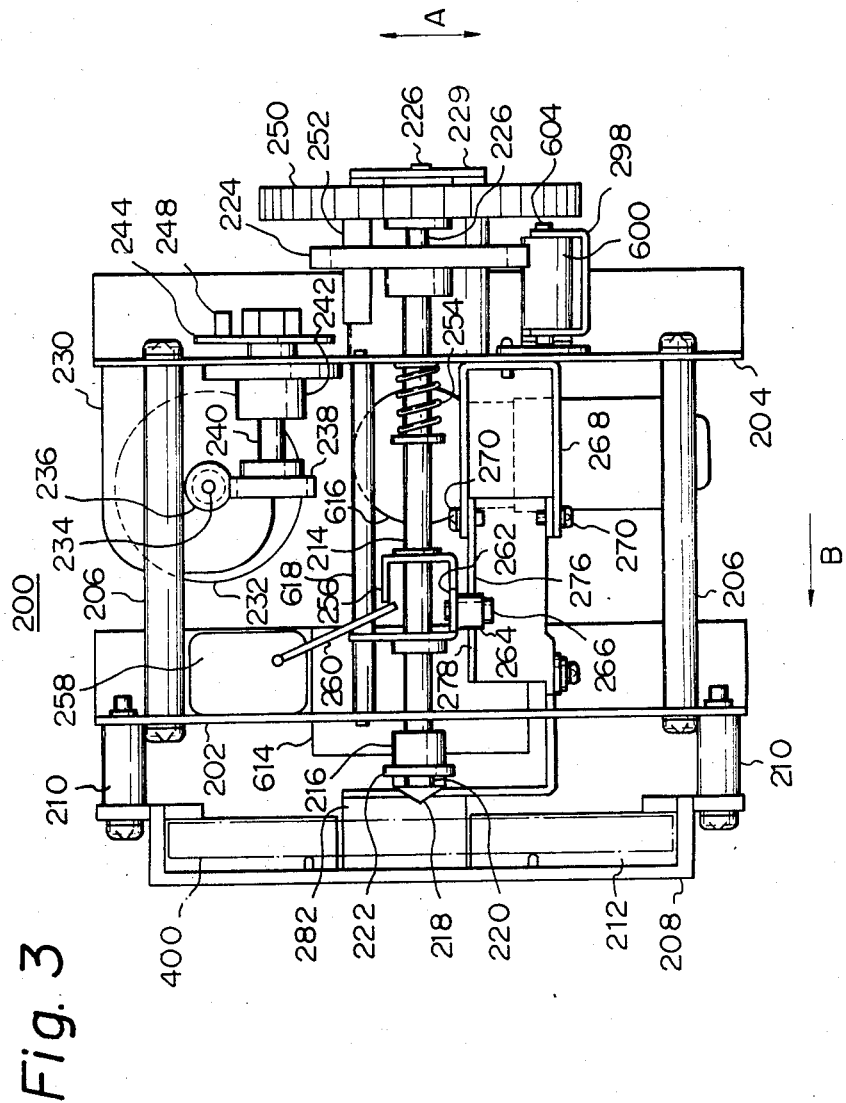
FIG. 3 is a top plan view of the disk film projector shown in FIG. 1.

The cam 244 also has a cylindrical boss 248, as shown in FIG. 3. As described below, the gear 244 can selectively assume either the position shown in FIG. 3 or the position shown in FIG. 4 in the longitudinal direction of shaft 214. The boss 248 has a length such that the boss is engaged with the recess between two neighboring teeth 228 of the gear 224, when the gear assumes the position shown in FIG. 3. In other words, the shafts 214 and 240 are positioned relative to each other so that, when the cam 244 is driven in rotation about shaft 240, the boss 248 will be brought into the recess between two neighboring teeth 228 of the gear 224 to abut on one of the teeth 228 to drive the gear 224 to rotate. Thus, when the motor 232 is energized into operation, the cam 244 is turned for thus causing the gear 224, and hence the spindle 214, to rotate associatedly.

It should be noted that a rotary plate 250 in the form of a disk is rotatably supported by the supporting member 226. The rotary plate 250 has a stud 252 secured at its one end, and the other end of the stud 252 is freely passed through an opening 252a in the gear 224. The gear 224 may selectively take the positions shown in FIGS. 3 and 4, as discussed hereinafter. The stud 252 is of a length such that it may be engaged with the opening 252a regardless of the positions occasionally assumed by the gear. Hence, manual driving in rotation of the rotary plate 250 in the direction of the arrow A will cause the gear 224, and hence the spindle 214 associatedly, to be rotated.

The spindle 214 is biased in the direction of the arrow B by a coil spring 254 retained under compression against the flat plate 204. A manual operating member 256 is mounted to the mid part of the spindle 214 as shown. The main body of the member 256 is generally in the form of a letter C as shown in FIG. 3. The C-shaped main body of the member 256 passes therethrough a guide member 618 carried by the flat plates 202 and 204. With the opened part of the letter C, there is loosely engaged an arm 260 of a limit switch 258 secured to the flat plate 202. Thus the limit switch 258 may be responsive to the movements of the spindle 214 in the directions of the arrow B and opposite thereto.

The upper part of the C-shaped main body of the member 256 has a boss 262 which is associated with an operating knob, not shown, which may be pulled in the direction opposite to the arrow B for shifting the spindle 214 against the force of spring 254. The gear 224 is shifted in response along with the spindle 214 because it is made fast with the spindle 214. The rotary plate 250 is, however, not moved in the direction of the arrow B, since the supporting member 226 is telescopically fitted into the hollow inner part of the spindle 214 so that the spindle is freely slidable.

Thus, even when a cover is mounted as indicated partially by a chain-and-dot line 619 in FIG. 5 for closing the housing 300 in its entirety with the rotary member 250 partially exposed through an opening, not shown, of the cover 619 for manipulating the rotary member 250 from outside, the member 250 not shifted in the direction of the arrow B may facilitate the operation thereon from the outside. Additionally, it is sufficient to design the opening corresponding in size to the exposed portion of the rotary member 250. It should be noted that FIGS. 3 and 4 show the situations in which the spindle 214 takes at its right and left side positions, respectively.

The lower part of the main body of member 256 has a roller 264 rollably mounted by a shaft 266. As shown in FIG. 4, the foremost part of a supporting member 268 secured to the flat plate 204 carries a shaft 270, which rotatably mounts thereon an arm 272 having an upper portion 274 in the form of a hook, or the letter Z, with a lower side 276 and an elevated side 278 formed. Depending on the positions assumed by the spindle 214, the roller 264 of the member 256 abuts and slides on the lower side 276 or the elevated side 278. Accordingly, when the spindle 214 is at the position shown in FIG. 3, the roller 264 rests on the lower side 276. When the spindle 214 is at the position shown in FIG. 4, the roller 264 rests on the elevated side 278.

Figure 4:
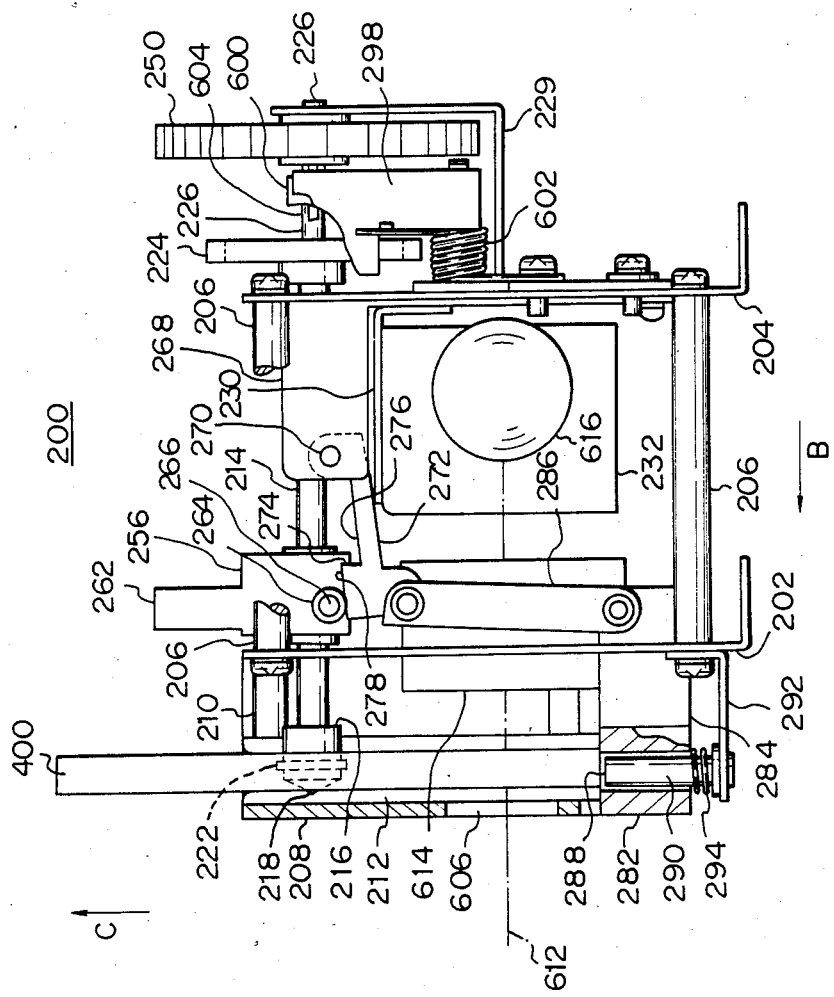
FIG. 4 is a partially taken out, bottom view showing the projector shown in FIG. 3, with a disk cartridge loaded in position.
Figure 6:
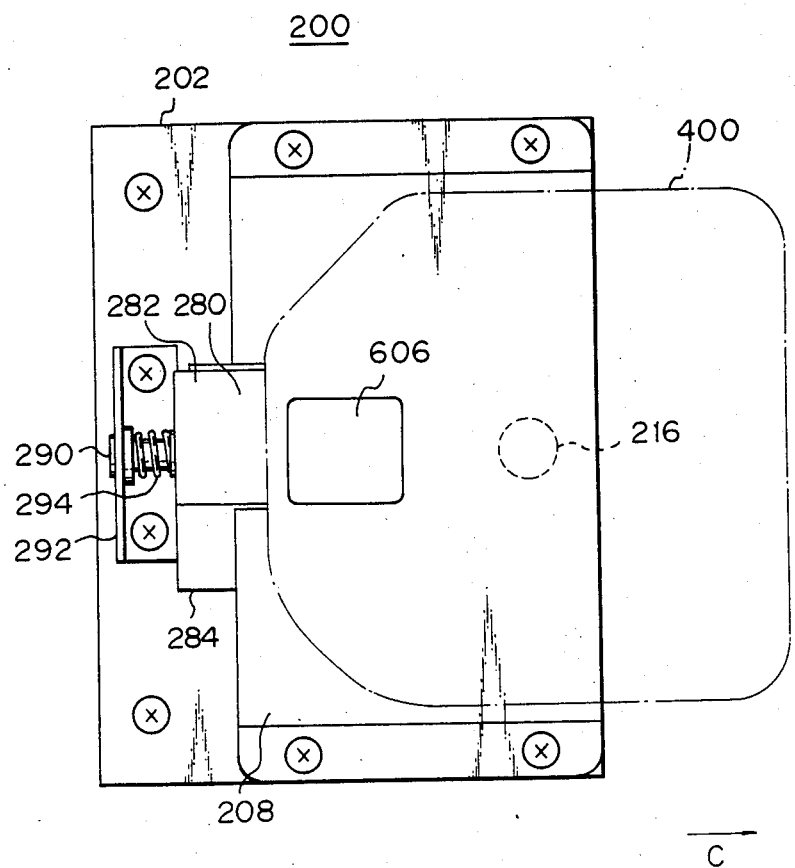
FIG. 6 is similarly a left-hand side view showing the projector of FIG. 3.

It should be noted that, as shown in FIG. 6, the cartridge holder 208 has a rectangular cut-out 280 at the lower part in FIG. 4. The cut-out 280 receives part of an abutment member 282. The abutment member 282 is supported by an L-shaped arm 284, which in turn is connected by a link 286 to the arm 272. As shown in FIG. 4, the abutment member 282 has a cylindrical central opening 288 in which a supporting post 290 slidably disposed. The post 290 is mounted to the flat plate 202 by an L-shaped arm 292, and associated with a coil spring 294, which is retained under compression by the L-shaped arm 292 and urges the member 282 in the direction of an arrow C.

When the cartridge 400 is inserted into the recess 212 of the cartridge holder 208, the foremost part of the cartridge 400 abuts on the upper surface of the abutment member 282. When the cartridge 400 is pressed down further manually in the direction opposite to the arrow C, the abutment member 282 is lowered against the expanding force of the spring 294. The arm 284 and the link 286 are lowered correspondingly, so that the arm 272 is turned about shaft 270 counterclockwise in FIG. 4. It should be recalled that the spindle 214 is spring-biased in the direction of the arrow B. When the arm 272 is turned in the aforementioned manner, the roller 264 of the manual operating member 256 so far resting on the lower side 276 of the upper portion 274 of the arm 272 rides over the intermediate step, and shifts onto the elevated side 278 to continue to pressure the arm 272 counterclockwise. The forces of the springs 254 and 294, as well as the shape and position of the elevated side 278 and other dimensions, are so selected that the aforesaid pressuring force is greater than the repelling force of the spring 294, and so that the roller 264 is not returned in the direction opposite to the arrow B under the repelling force of the spring 294. In this manner, the cartridge 400 is held at the position shown in FIG. 4.

When the spindle 214 is moved in the direction of the arrow B, the end piece 216 is passed through the opening 408 of the cartridge 400 to be engaged with the opening 506 of the core 502. Since the tip 218 is in the form of a regular cone, such engagement may occur smoothly. When the rotary member 250 is turned manually, or in response to the motor 232 turning the spindle 214 in the direction of the arrow A, the lugs 220 at the tip 218 will be brought into engagement with the corresponding plurality of cut-outs 510 of the core 502, while the tip 218 advancing into the opening 506 until its annular flange 222 rests on the edge of core 502. In this manner, the tip 218 is engaged appropriately with the opening 506 of the core 502.

The force applied to the core 502 by the end piece 216 during such engagement of the tip 218 with the core 502 is stably derived from the spring 254, whereas other unstable external forces derived from manual operation would not be applied to the core 502. In this manner, the film 504 and the core 502, which are intrinsically delicate, will be protected from damage occasionally caused by engagement with the end piece 216.

Referring to FIG. 5, flat plate 204 carries an arm 298 turnably about a shaft 296 secured thereto by fastening means, not shown. Arm 298 supports roller 600 on a shaft 604 at its free end. The roller 600 may roll freely about shaft 604 to be engageable with teeth 228 of the gear 224. The arm 298 is biased by a coil spring 602 to rotate clockwise in FIG. 5 about shaft 296. This induces clicking in rotation, i.e. an intermittent rotation of the gear 224.

More specifically in the present embodiment, since fifteen images may be formed on the film 504, the gear 224 has fifteen teeth 228 accordingly. Thus the gear 224 may stop in stepwise fifteen positions, the roller 600 being positioned between two adjacent teeth 228 at each of these fifteen stop positions. In other words, the gear 214 takes fifteen stop positions in the direction of rotation about the spindle 214.

As shown in FIG. 6, the lower part of the cartridge holder 208 has a rectangular optical opening 606 corresponding in shape to the frame 512. Thus, when the motor 232 is driven in operation with the cartridge 400 loaded in the present device and the tip 218 of the spindle 214 engaged with the opening 506 of the core 502, the boss 248 of the cam 244 is brought into engagement with the gear 224 during a rotation of the cam 244, thus causing the gear 224 to rotate. This causes rotation of the spindle 214 about its own axis, and hence, associated rotation of the film 504 within the cartridge 400.

There is a phase difference between teeth of the gear 224 which are to be engaged with the boss 248 and the roller 800. In the present embodiment, both are out of phase by 180 angular degrees relative to each other. It should be noted that the gear 224 is driven by motor 232 only when the boss 248 is engaged with teeth 228. Therefore, when the boss 248 is disengaged from the gear 224, and the roller 600 abuts on and descends into the gap between the adjoining teeth 228, the gear 224 is brought to a stop thereat in stability under an external force supplied from the roller 600. In other words, the gear 224 is brought to a stop whenever each frame 512 is substantially in register with the opening 606. In this manner, a selected one of the frames 512 will be brought into register with the opening 606, that is, into the projecting position.

Preferably, current supply to the motor 232 is interrupted at this time by the circuit shown in FIG. 7, and/or an electrical braking may be applied to the motor 232, or alternatively a mechanical braking applied to the driving system of the cam 244. In this manner, the cam 244 will be stopped at a position in which the boss 248 is not engaged with the gear 224, in order that the shifting from the state shown in FIG. 3 to the state shown in FIG. 4 may take place smoothly without abutment of the gear 224 on the boss 248. It is to be noted that the above described limit switch may be used advantageously for effecting such electrical braking.

Even in the state shown in FIG. 4, the gear 224 is not engaged with boss 248, unless the motor 232 is in operation. Naturally in the state shown in FIG. 3, the gear 224 is not engaged with boss 248. Therefore, in these circumstances, the spindle 214, and hence the disk 500, can smoothly be rotated in response to the rotary member 250 turned manually. In other words, since the disk 500 is not mechanically associated with the driving system of the electric motor 232 in this situation, it can be turned at light load without operating on the heavy load, such as the driving mechanism of the motor 232. It should be noted that the intermittent rotation or clicking motion effected by the roller 600 and the teeth 228 is effective in this state so that each frame 512 can be stopped in correct alignment with the optical opening 606.

As shown in FIG. 4, a projection optical system 614 and a light source 616 are arranged on a central optical axis of the opening 606. Light source 616 may advantageously include an incandescent lamp of a higher color temperature for projection of color images. The light source 616 is attached to the flat plate 604 by attaching means, not shown. The optical system 614 is essentially comprised of a lens system for condensing the light from the light source 616, a light deflecting plate for scattering the condensed light, and a color temperature adjustment filter, all not shown. The latter is used for cancelling orange color caused from an orange mask which is commonly used on a color negative applicable to the film 504.

The opening 606, projection optical system 614 and light source 616 are thus aligned on optical axis 612. A frame 512 of the film 504 placed on the optical axis 612 is illuminated by the light source 616 through the projection optical system 614, so that the image of the frame 512 may be shot by television camera 100.

For taking out the cartridge 400, the boss 262 on the manual operating member 256 is manually pulled against the force of the spring 254 in the direction opposite to the arrow B, so that the spindle 214 is disengaged from the opening 408 of the cartridge 400. At this time, the roller 264 is moved from the elevated side 278 towards the lower side 276 on the upper portion 274 of the arm 272 contact maintained with side 278 and then 276. At this time, the abutment member 282 is raised by spring 294 to eject the cartridge 400 out, the arm 272 being turned clockwise in FIG. 4. When the manual force is then released, the roller 264 is urged in the direction of the arrow B under the repelling force of the spring 254 to be engaged with the step on the upper portion 274. Since the arm 272 is not pressed down counterclockwise unless the abutment member 282 is acted on again, the cartridge 400 remains in the ejected position for subsequent exchange to another cartridge as desired.

From the foregoing it is seen that the cartridge 400 can be loaded by a simple operation of manually inserting it into the recess 212 of the cartridge holder 208, and can be ejected by a similarly simple operation of pulling the boss 262. These manual operations is effected easily with one hand.

According to the present invention, as described hereinabove, a disk film may be rotatingly driven by both manual and electrical routes. While the manual route is mechanically connected with the disk film driving shaft, the electrical driving route is interrupted from the shaft unless driven. It should be apparent that the disk film projector of the present invention is simpler in structure, and yet allows desired one of the disk film frames to be selected in response to either of manual and electrical operations.

While the present invention has been described with reference to the particular illustrative embodiment, it is not to be restricted by the embodiment but only by the appended claims. It is to be appreciated that those engaged in the art can change or modify the embodiment without departing from the scope and spirit of the present invention.

What is claimed is:

1. A disk film projector for manually or automatically projecting an image from frames of a rotary disk of film which comprises:
   a housing;
   a drive shaft supported within said housing for rotating said rotary disk of film;
   manual means, operatively connected to said drive shaft, for independently rotating said drive shaft;
   motor means for independently rotating said drive shaft; and connecting means, interposed between said motor means and said drive shaft, for intermittently stopping rotation of said drive shaft at positions to selectively project said frames and for permitting the disk of film to be rotated in response to either independent action of said motor means or independent action of said manual means in a manner such that said motor means is disengaged during rotation of said shaft by said manual means, said connecting means including:

gear means connected to said drive shaft and having gear teeth associated with said frames, abutting means connected to said motor means for engaging with said gear teeth to drive said gear means, and electrical means for controlling said motor means for causing said abutting means to be moved away from said gear means when said motor is not operating.

2. The disk film projector according to claim 1 which further comprises roller means for engaging with said teeth of said gear means for stabilizing said gear means at each projecting position.

3. The disk film projector according to claim 1, wherein said manual means is partially exposed from said housing to permit operation of said manual means from the exterior of said housing.

4. The disk film projector of claim 1, wherein said motor means is an electric motor.

* * * * *